S. D. BUTTERWORTH.
APPARATUS AND METHOD FOR LOADING AUTOMOBILES.
APPLICATION FILED APR. 1, 1918.

1,299,912.

Patented Apr. 8, 1919.
3 SHEETS—SHEET 1.

INVENTOR
SAMUEL D. BUTTERWORTH
BY Stuart C Barnes
ATTORNEY

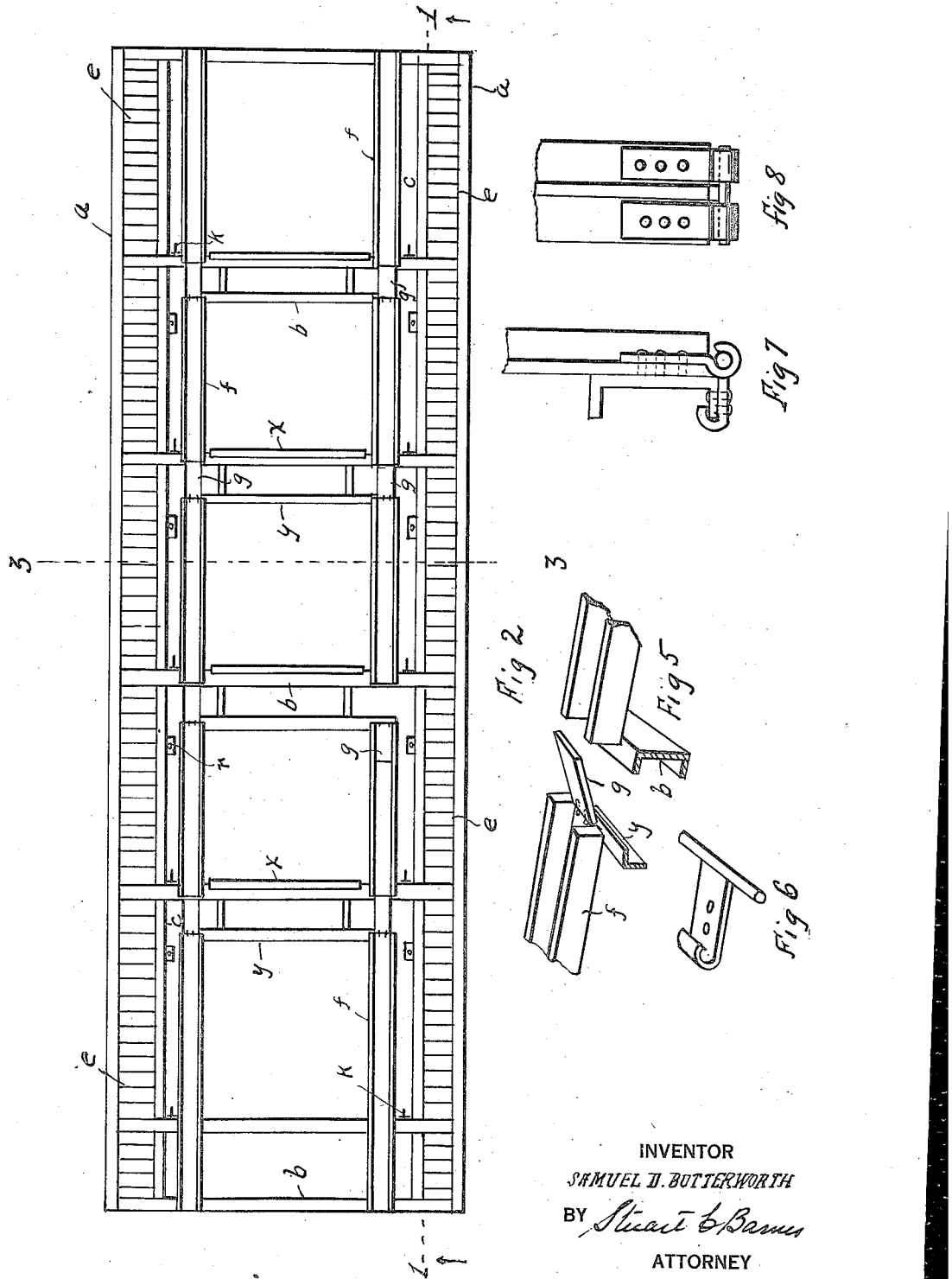

S. D. BUTTERWORTH.
APPARATUS AND METHOD FOR LOADING AUTOMOBILES.
APPLICATION FILED APR. 1, 1918.
1,299,912.
Patented Apr. 8, 1919.
3 SHEETS—SHEET 3.
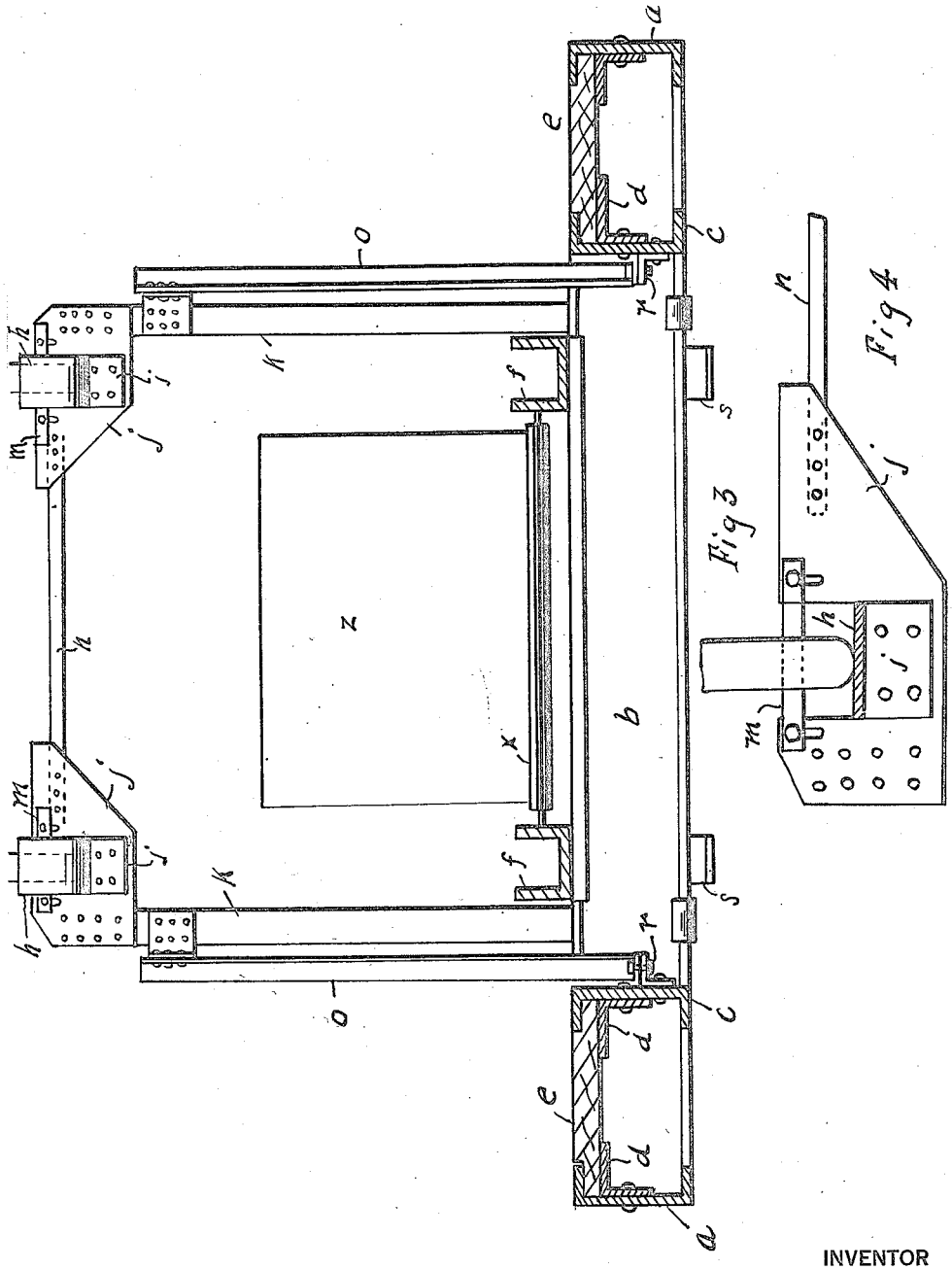
INVENTOR
SAMUEL D BUTTERWORTH
BY
ATTORNEY

UNITED STATES PATENT OFFICE.

SAMUEL D. BUTTERWORTH, OF LANSING, MICHIGAN.

APPARATUS AND METHOD FOR LOADING AUTOMOBILES.

1,299,912.     Specification of Letters Patent.     Patented Apr. 8, 1919.

Application filed April 1, 1918. Serial No. 225,883.

*To all whom it may concern:*

Be it known that I, SAMUEL D. BUTTERWORTH, a citizen of the United States, residing at Lansing, in the county of Ingham and State of Michigan, have invented a new and Useful Improvement in Apparatus and Methods for Loading Automobiles, of which the following is a specification.

This invention relates to apparatus for loading flat cars with automobiles. This application also includes the method of loading flat cars with automobiles.

It has heretofore been proposed to load automobiles on freight cars in oblique and overlapped relation in order to increase what would be the capacity of the flat car if the automobiles merely rested on the car in their usual horizontal position. To secure this loading in this way it has heretofore been proposed to use inclined ways up which the cars were driven.

It is the object of the present invention to improve the construction of the apparatus which secures loading of this character, and this improvement consists in a plurality of swinging stanchions or frames which operate in connection with the automobile itself to raise the front end of the automobile to give this oblique disposition to the cars. This will more fully appear in the specification following.

In the drawings,—

Fig. 2 is a plan view, the details of the swinging stanchions being omitted for clearness.

Fig. 3 is a cross section taken on the line 3—3 of Fig. 2.

Fig. 4 is a detail of the saddle of the swinging stanchions which supports the front wheel of the automobile.

Fig. 5 is a detail in perspective of the runway for the wheels and the trap door in the runway.

Fig. 6 is a detail of one of the hinge plates for the stanchion hinge.

Figs. 7 and 8 are side and front elevations of the stanchion hinge.

Figure 1:
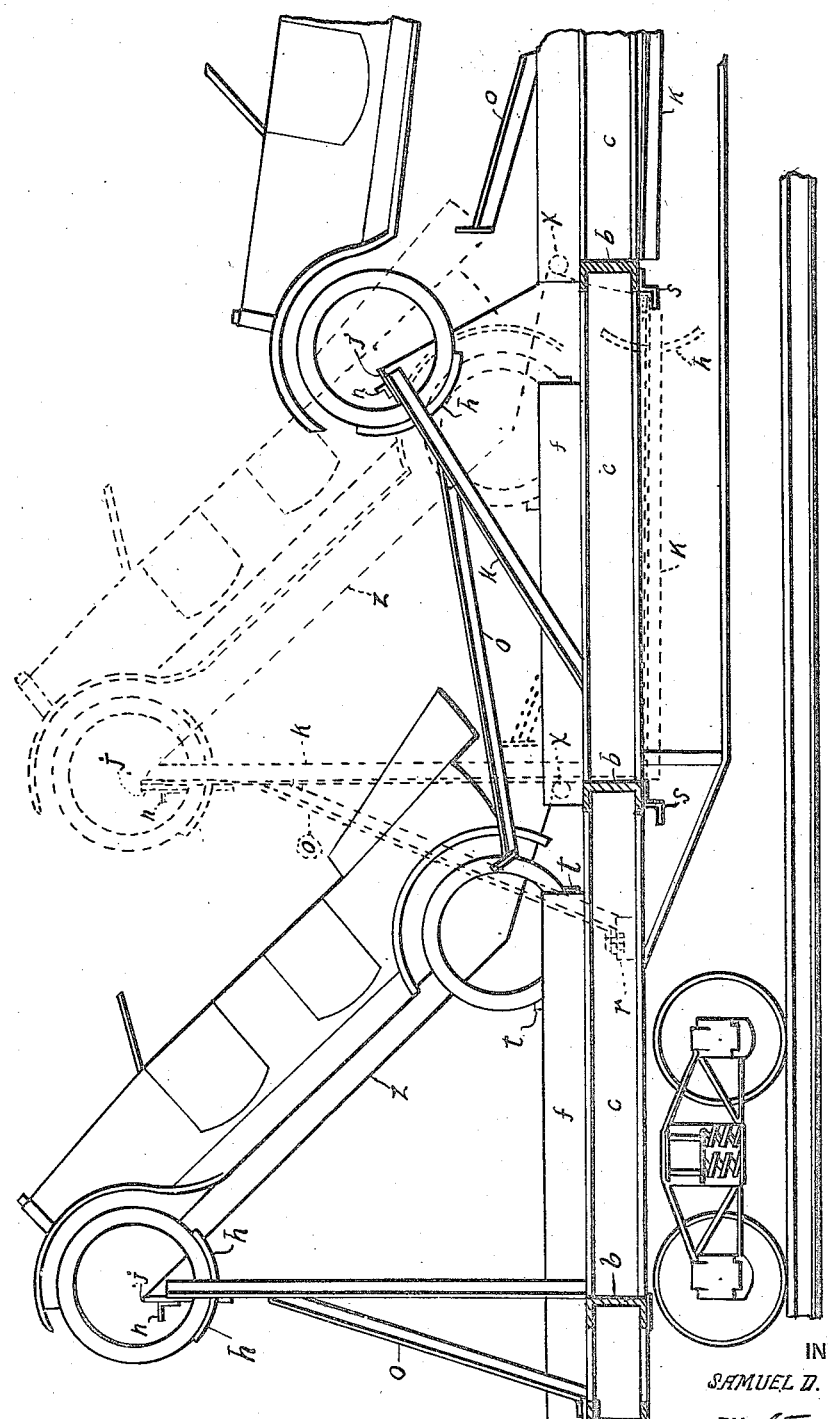
Figure 1 is a view which is largely a side elevation but is really a section taken on the line 1—1 of Fig. 2.

This flat car is specially constructed for the purpose of carrying automobiles. A pair of channel bars $a$, $a$ form the side bars of the car body. These are connected by cross girders $b$. A plurality of outwardly facing channel bars $c$ connect the cross girders and parallel the side bars $a$. On the inside of these channel bars $a$ and $c$ are riveted the angle bars $d$ which serve to support the boards $e$ that form a board-walk at the sides of the car for the brakeman.

On top of the cross girders and cross bars $y$ are supported wooden troughs which form runways $f$ for the automobile wheels. Each of these runways is really made up of a plurality of sections. The sections are joined by trap doors $g$ (Fig. 5) which are hinged to one member and seat upon the girders and cross bars as shown in Fig. 5. This trap door permits the saddles of the stanchion frames to swing through the runway.

Referring to Fig. 3, these saddles can be understood. The saddle is designated $h$ and comprises simply a pair of segmental plates (see Fig. 1) which form in the aggregate about a quarter of a circle. They are each provided with lips $i$ riveted to the gusset plates $j$, which in turn are riveted to the top of the stanchions $k$ of T bar cross section. The gusset plate has a pair of vertical slots that allows the clamping bar $m$ to be adjusted up and down. This bar $m$ when bolted into place engages with the rim of the wheel and holds the wheel tightly to the saddle as shown in Fig. 4. These gussets are connected by the angle bar $n$ which forms a bridge from stanchion top to stanchion top. Each stanchion is provided with an angle brace $o$ whose foot can be bolted to the rests $r$ that are riveted to the side of the angle bars $c$. The Z bars $s$ form stops to hold the stanchion frames in lowered position. A spring controlled roller $x$ is journaled in the side of the runway and a curtain $z$ fastened to the top of the stanchions raises and lowers with the stanchions. This curtain $z$ keeps drippings off the next car underneath.

Referring to Fig. 1, the operation of the swinging stanchions will be clearly understood. A number of flat cars can be shunted onto a siding and any suitable manner of approach can be obtained to the end flat car. The automobiles can be driven up this approach or onto the end flat car from a platform and then over the several flat cars, the wheels of the automobiles running in the runways. Any convenient way of connecting the runways from car to car may be utilized, as for instance, simple plates. The automobile is then driven to the farthest flat car and the farthest stanchion on this car is held up until the saddles engage against the front tires and the clamping plates *m* are bolted in place. The stanchions being inclined slightly above the dead center thrust line between the car and the pivoting axis of the stanchions, the automobile is given the power and consequently starts to lift the stanchion and its own front whels and will lift the entire stanchion frame up in the position shown in the dotted lines of Fig. 1, whereupon the foot of the angle brace *o* will strike against the rest *r* when the stanchion has reached the upright position. It may then be bolted to this rest. Slats *t, t* may be nailed across the runway fore and aft the rear wheel to hold this in place. The car is now ready for shipment. Obviously other cars may be run onto flat cars and the stanchion frames raised in the same way until the entire train load is ready for shipment.

What I claim is:

1. In apparatus for loading automobiles, a plurality of swinging stanchions spaced apart to hold automobiles in oblique and overlapped position, a body upon which the stanchions are pivoted, and means on each stanchion whereby when the front wheel of an automobile is rested in said means application of power to the automobile causes the stanchion to raise and lift the front wheels of the automobile.

2. In apparatus for loading automobiles, the combination of a body, a plurality of swinging stanchions pivoted thereto and spaced apart to hold automobiles in oblique and overlapped relation and a saddle on the top of the stanchion whereby when the automobile front wheel is rested on the saddle and power applied to the automobile, the stanchion raises and pulls the front of the car up with it.

3. In apparatus for loading automobiles, a plurality of swinging stanchions spaced apart to hold automobiles in oblique and overlapped relation, a body upon which the stanchions are pivoted, and means on the stanchions whereby when the front of an automobile is rested on said means application of power to the automobile causes the stanchions to raise and lift the front of the automobile.

4. In apparatus for loading automobiles, the combination of a stanchion, a body to which the stanchion is pivoted provided with a rest, an angle brace secured to the stanchion having a foot adapted to engage against the rest and be secured thereto when the stanchion is in upright position, and means on the top of the stanchion whereby when the automobile front is run against said means and power applied to the automobile the stanchion is caused to raise until the angle foot brace engages against the said rest.

5. In apparatus for loading automobiles, the combination of a stanchion, a body to which the lower end of the stanchion is pivoted, a gusset secured to the stanchion, and a saddle secured to the gusset.

6. In apparatus for loading automobiles, the combination of a stanchion, a body to which the lower end of the stanchion is pivoted, a gusset secured to the top of the stanchion, and a saddle in the form of a pair of segments secured to the gusset.

7. In apparatus for loading automobiles, the combination of a stanchion, a body to which the lower end of the stanchion is pivoted, a gusset secured to the top of the stanchion, and a saddle for the purpose specified comprising a pair of segments each having lips which are riveted to the gusset.

8. In apparatus for loading automobiles, the combination of a pair of stanchions, a body to which the lower ends of the stanchions are pivoted, a pair of gussets, saddles secured to the gussets, and a cross bar connecting the gussets together to bridge the top of the stanchion to form a stanchion frame.

9. Apparatus for loading automobiles, comprising a pair of runways, and stanchions provided with means at their tops whereby when a front of an automobile is rested in said means and power is applied to the automobile the stanchion rises, the said runways being arranged to allow the upper portions of the stanchions to swing through the same.

10. In apparatus for loading automobiles, the combination of runways provided with trap doors, and stanchions pivoted at their lower ends and provided with means at their tops whereby when the automobile fronts are rested in said means and power applied to the automobile the stanchion is caused to swing upward carrying the front end of the car with it, the said trap doors being arranged to allow the top portions of the stanchion to swing through the runways.

11. The combination of a pivoted frame for raising an automobile and a curtain fastened to the frame and raised and lowered therewith for the purpose specified.

In witness whereof I have hereunto set my hand on the 28th day of March, 1918.

SAMUEL D. BUTTERWORTH.